(12) United States Patent
Rofougaran et al.

(10) Patent No.: US 8,145,142 B2
(45) Date of Patent: Mar. 27, 2012

(54) METHOD AND SYSTEM FOR INCREASED RESOLUTION SWITCHING USING MEMS AND SWITCHED CAPACITORS

(75) Inventors: Ahmadreza Rofougaran, Newport Coast, CA (US); Maryam Rofougaran, Rancho Palos Verdes, CA (US)

(73) Assignee: Broadcom Corporation, Irvine, CA (US)

( * ) Notice: Subject to any disclaimer, the term of this patent is extended or adjusted under 35 U.S.C. 154(b) by 829 days.

(21) Appl. No.: 11/954,873

(22) Filed: Dec. 12, 2007

(65) Prior Publication Data

US 2009/0156137 A1 Jun. 18, 2009

(51) Int. Cl.
*H04B 1/44* (2006.01)
*H04M 1/00* (2006.01)
(52) U.S. Cl. ............... 455/78; 455/83; 455/550.1
(58) Field of Classification Search .......... 455/73, 455/77, 78, 79, 82, 83, 550.1
See application file for complete search history.

(56) References Cited

U.S. PATENT DOCUMENTS

| | | | |
|---|---|---|---|
| 6,987,966 B1* | 1/2006 | Wu et al. | 455/420 |
| 7,366,473 B2* | 4/2008 | Lin et al. | 455/63.4 |
| 2004/0222506 A1 | 11/2004 | Wei et al. | |
| 2005/0186917 A1* | 8/2005 | Rofougaran et al. | 455/73 |
| 2006/0135084 A1* | 6/2006 | Lee | 455/78 |
| 2006/0139993 A1* | 6/2006 | Kang et al. | 365/158 |
| 2006/0203421 A1* | 9/2006 | Morris et al. | 361/277 |
| 2007/0063788 A1* | 3/2007 | Zhu et al. | 333/32 |
| 2007/0105506 A1* | 5/2007 | Kemmochi et al. | 455/78 |
| 2007/0232241 A1* | 10/2007 | Carley et al. | 455/83 |
| 2008/0094149 A1* | 4/2008 | Brobston | 333/17.3 |
| 2008/0164961 A1* | 7/2008 | Premerlani et al. | 335/7 |
| 2009/0115255 A1* | 5/2009 | Kumfer et al. | 307/113 |

\* cited by examiner

*Primary Examiner* — Andrew Wendell
(74) *Attorney, Agent, or Firm* — Farjami & Farjami LLP (57) ABSTRACT

Certain aspects of a method and system for increased resolution switching using MEMS and switched capacitors may include a mobile terminal that includes an integrated circuit bonded to a multi-layer package. A capacitance of a first switched capacitor array in the multi-layer package may be tuned via one or more MEMS switches integrated in and/or on the multi-layer package. A capacitance of a second switched capacitor array in the integrated circuit may be tuned via one or more NMOS switches. A plurality of signals may be transmitted and/or received via one or more antennas in the mobile terminal.

19 Claims, 6 Drawing Sheets

METHOD AND SYSTEM FOR INCREASED RESOLUTION SWITCHING USING MEMS AND SWITCHED CAPACITORS

CROSS-REFERENCE TO RELATED APPLICATIONS/INCORPORATION BY REFERENCE

Not Applicable

FEDERALLY SPONSORED RESEARCH OR DEVELOPMENT

Not Applicable

MICROFICHE/COPYRIGHT REFERENCE

Not Applicable

FIELD OF THE INVENTION

Certain embodiments of the invention relate to wireless communication. More specifically, certain embodiments of the invention relate to a method and system for increased resolution switching using MEMS and switched capacitors.

BACKGROUND OF THE INVENTION

Mobile communications have changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

As the number of electronic devices enabled for wireline and/or mobile communications continues to increase, significant efforts exist with regard to making such devices more power efficient. For example, a large percentage of communications devices are mobile wireless devices and thus often operate on battery power. Additionally, transmit and/or receive circuitry within such mobile wireless devices often account for a significant portion of the power consumed within these devices. Moreover, in some conventional communication systems, transmitters and/or receivers are often power inefficient in comparison to other blocks of the portable communication devices. Accordingly, these transmitters and/or receivers have a significant impact on battery life for these mobile wireless devices.

Switched capacitor arrays may be utilized for tuning various functions in an integrated circuit. In this regard, a wide range of capacitance values in the switched capacitor array may provide the broadest possible tuning capabilities. However, integrating large capacitors into a silicon die may be costly due to the large amount of area required.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for increased resolution switching using MEMS and switched capacitors, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for increased resolution switching using MEMS and switched capacitors. Exemplary aspects of the invention may comprise a mobile terminal or other device that may comprise an integrated circuit bonded to a multi-layer package. A capacitance of a first switched capacitor array in the multi-layer package may be tuned via one or more MEMS switches integrated in and/or on the multi-layer package. A capacitance of a second switched capacitor array in the integrated circuit may be tuned via one or more NMOS switches. A plurality of signals may be transmitted and/or received via one or more antennas in the mobile terminal. The multi-layer package with the integrated circuit bonded thereto may comprise a hybrid or hybridized circuit.

Figure 1:
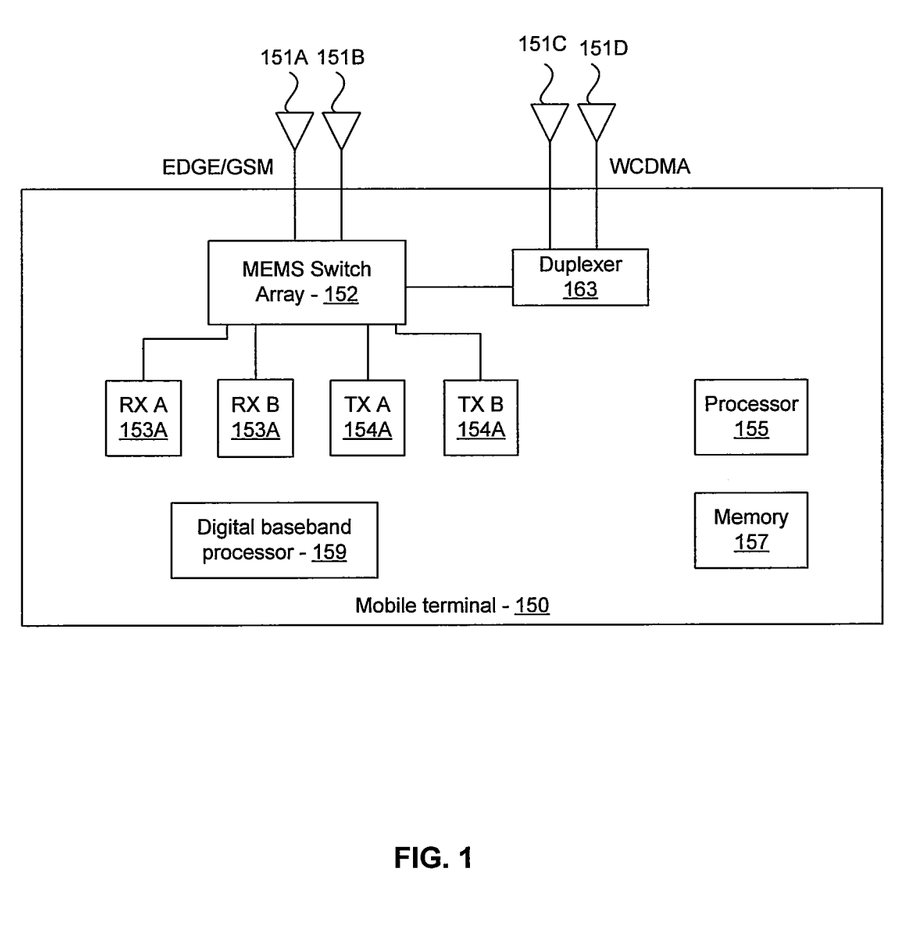
FIG. 1 is a block diagram of an exemplary multi-band wireless system utilizing MEMS switch arrays, in accordance with an embodiment of the invention.

FIG. 1 is a block diagram of an exemplary multi-band wireless system utilizing MEMS switch arrays, in accordance with an embodiment of the invention. Referring to FIG. 1, there is shown a wireless system 150 that may comprise RF receivers, RX A 153A and RX B 153B, RF transmitters TX A 154A and TX B 154B, a MEMS switch array 152, a digital baseband processor 159, a processor 155, a memory 157, a duplexer 163 and a plurality of antennas 151A, 151B, 151C and 151D. One or more of the antennas, 151A, 151B, 151C and 151D may be communicatively coupled to the MEMS switch array 152 or the duplexer 163, wherein each antenna may be designed for a specific frequency range. The MEMS switch array 152 may couple an appropriate transmitter TX A 154A or TX B 154B to an antenna on the wireless system 150, depending on the frequency requirements of the system. The MEMS switch array 152 may couple one or more of the antennas 151A, 151B, 151C and 151D to an appropriate receiver RX A 153A or RX B 153B, depending on the application. The antennas 151A and 151B may be used for EDGE/GSM applications, for example, and the antennas 151C and 151D may be utilized via the duplexer 163 for WCDMA applications, for example. The frequency range for each of these exemplary applications may vary depending on country.

The RF receivers RX A 153A and RX B 153B may comprise suitable logic, circuitry, and/or code that may enable processing of received RF signals. The RF receivers RX A 153A and RX B 153B may enable receiving of RF signals in frequency bands utilized by various wireless communication systems, such as Bluetooth, WLAN, GSM, and/or WCDMA, for example. The MEMS switch array 152 may be enabled to couple the receivers RX A 153A and/or RX B 153B to the appropriate antenna, depending on the application and/or frequency.

The digital baseband processor 159 may comprise suitable logic, circuitry, and/or code that may enable processing and/or handling of baseband signals. In this regard, the digital baseband processor 159 may process or handle signals received from the RF receivers RX A 153A and RX B 153B and/or signals to be transferred to the RF transmitters TX A 154A and TX B 154B for transmission via a wireless communication medium. The digital baseband processor 159 may also provide control and/or feedback information to the RF receivers RX A 153A and RX B 153B and to the RF transmitters TX A 154A and TX B 154B, based on information from the processed signals. The digital baseband processor 159 may communicate information and/or data from the processed signals to the processor 155 and/or to the memory 157. Moreover, the digital baseband processor 159 may receive information from the processor 155 and/or the memory 157, which may be processed and transferred to the RF transmitters TX A 154A and TX B 154B for transmission to the wireless communication medium.

The RF transmitters TX A 154A and TX B 154B may comprise suitable logic, circuitry, and/or code that may enable processing of RF signals for transmission. The RF transmitters TX A 154A and TX B 154B may enable transmission of RF signals in frequency bands utilized by various wireless communications systems, such as Bluetooth, WLAN, GSM and/or WCDMA, for example, and as such may be frequency tunable and standard selectable. In an embodiment of the invention, each of the RF transmitters TX A 154A and TX B 154B may be configured for a particular application, frequency and/or power level, for example. In this manner, the MEMS switch array 152 may be utilized to couple the appropriate RF transmitter for a particular application. The number of RF transmitters and receivers may not be limited to the number shown in FIG. 1. Accordingly, any number of RF transmitters and receivers may be integrated in the wireless system 150 defined by the number of wireless standards, frequencies and/or power levels required, for example.

The processor 155 may comprise suitable logic, circuitry, and/or code that may enable control and/or data processing operations for the wireless system 150. The processor 155 may be utilized to control at least a portion of the RF receivers RX A 153A and RX B 153B, the RF transmitters TX A 154A and TX B 154B, the digital baseband processor 159, and/or the memory 157. In this regard, the processor 155 may generate at least one signal for controlling operations within the wireless system 150.

The memory 157 may comprise suitable logic, circuitry, and/or code that may enable storage of data and/or other information utilized by the wireless system 150. For example, the memory 157 may be utilized for storing processed data generated by the digital baseband processor 159 and/or the processor 155. The memory 157 may also be utilized to store information, such as configuration information, that may be utilized to control the operation of at least one block in the wireless system 150. For example, the memory 157 may comprise information necessary to configure the RF receivers RX A 153A and/or RX B 153B to enable receiving RF signals in the appropriate frequency band.

The MEMS switch array 152 may comprise an array of individually addressable MEMS switches for selectively coupling the RF transmitters TX A 154A and TX B 154B and/or the RF receivers RX A 153A and RX B 153B to the appropriate antennas 151A and/or 151B or 151C and/or 151D via the duplexer 163. The MEMS switch array is further described with respect to FIGS. 2-4.

The duplexer 163 may comprise suitable circuitry, logic and/or code for combining two signals, for example, the output generated by the RF transmitters TX A 154A and TX B 154B and the signal received by the antenna 151C and/or 151D via the duplexer 163, into one such that communication may be transmitted and received on the same antenna concurrently. The duplexer 163 may comprise a plurality of duplexers in instances where multiple frequency bands may be desired, and may be utilized in applications, such as WCDMA, for example, where full duplex communication may be required.

In operation, one or both of the RF transmitters TX A 154A and TX B 154B may be enabled to generate one or more amplified RF signals. Depending on the wireless communication standard being utilized, the signal may be communicated to one or both of the antennas, 151A and 151B via the MEMS switch array 152. In another embodiment of the invention, the signal may be communicated to one or both of the antennas, 151C and 151D via the duplexer 163 and the MEMS switch array 152. The duplexer 163 may enable two-way communication of signals, allowing for transmitting and receiving simultaneously.

In another embodiment of the invention, in instances where duplex communication may not be required, the signal generated by the RF transmitters 154A or 154B may be communicated to the selected antenna or antennas 151A and/or 151B via the MEMS switch array 152.

Figure 2:
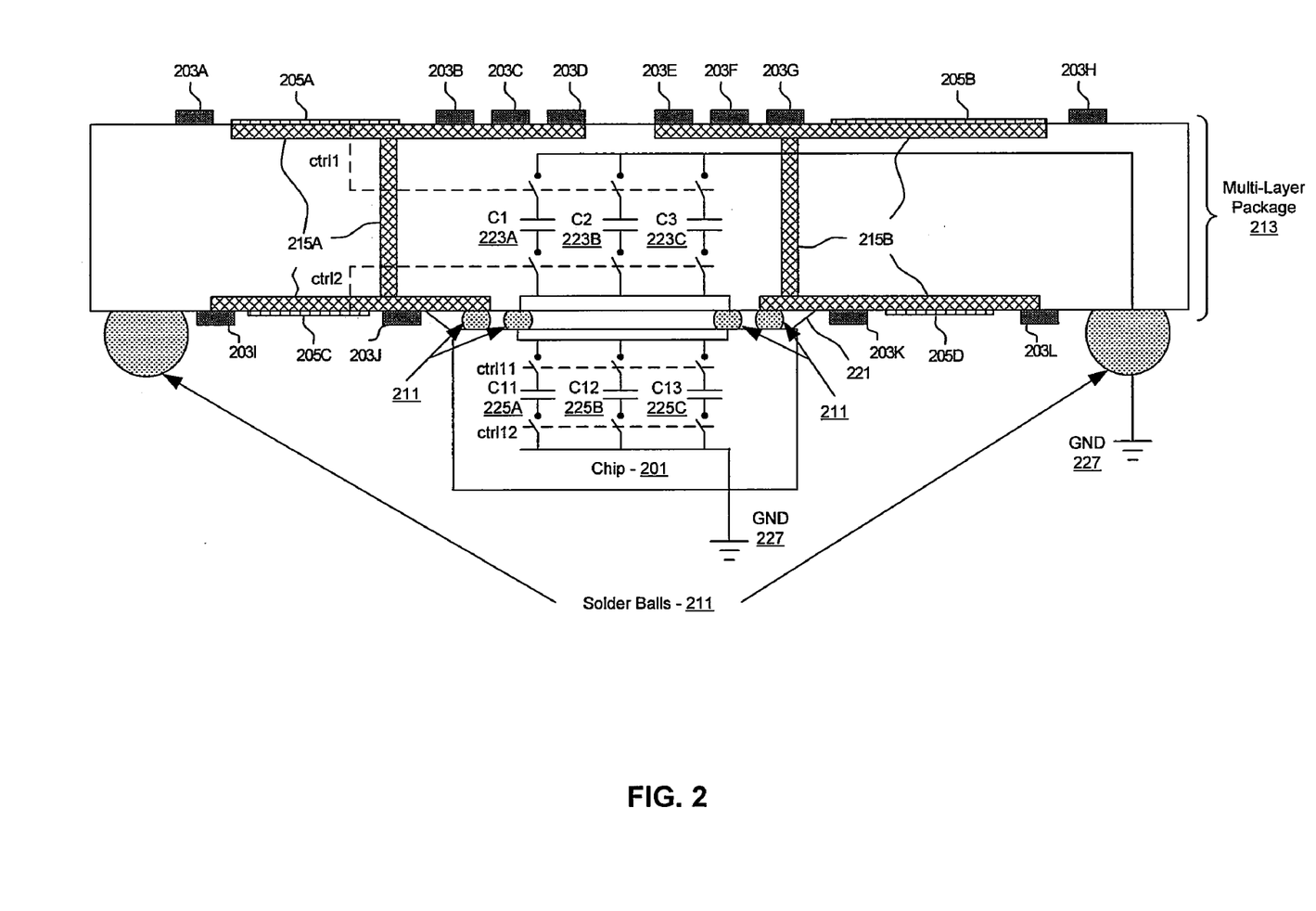
FIG. 2 is a block diagram illustrating a cross sectional view of MEMS switch arrays controlled by an integrated circuit for increased resolution switching, in accordance with an embodiment of the invention.

In an embodiment of the invention, the components of the wireless system 150 may be integrated on an integrated circuit, or chip, that may be coupled to a multi-layer package comprising a plurality of components on the top and bottom surfaces as well as embedded within the package, as further described in FIG. 2. The package may comprise a multi-layer structure to which integrated circuits may be flip-chip bonded. The incorporation of RF components, such as filters, inductors, capacitors and switches, for example, on integrated circuits may be increasingly difficult as the frequency of operation of devices increases to the tens of GHz range and/or decreases to the GHz range. Switching at high speeds with minimal insertion loss may present a significant challenge in wireless systems. MEMS switches may be capable of high switching speeds with low insertion loss, especially when compared to CMOS switches integrated on an IC. Incorporating MEMS switches onto a package that may be bump-bonded, or flip-chip bonded, to an integrated circuit enables the integration of high-speed, low-insertion loss switching and custom and/or multi-purpose integrated circuits.

FIG. 2 is a block diagram illustrating a cross sectional view of MEMS switch arrays controlled by an integrated circuit for increased resolution switching, in accordance with an embodiment of the invention. Referring to FIG. 2, there is shown a chip 201, circuit components 203A-L, MEMS switch arrays 205A-D, metal interconnect layers 215A and 215B, solder balls 211, a multi-layer package 213 and thermal epoxy 221.

The chip 201, or integrated circuit, may comprise the wireless system 150 described with respect to FIG. 1, or may also comprise any other chip that may require switched components. In an embodiment of the invention, the chip 201 may comprise a general purpose switching integrated circuit, enabled to control the MEMS switch arrays 205A-D. In another embodiment of the invention, the chip 201 may comprise an integrated circuit comprising a plurality of functions in addition to MEMS switching. The chip 201 may comprise an array of capacitors, for example, C11 225A, C12 225B and C13 225C that may be integrated into the chip 201. One end of the plurality of capacitors, for example, C11 225A, C12 225B and C13 225C may be coupled to ground (GND) 227. The other end of the plurality of capacitors, for example, C11 225A, C12 225B and C13 225C may be coupled to the multi-layer package 213 via one or more solder balls 211.

The plurality of capacitors, for example, C11 225A, C12 225B and C13 225C may be controlled and/or switched utilizing one or more NMOS switches in order to fine tune a capacitance of the chip 201. For example, one or more NMOS switches may be enabled to generate control signals ctrl11 and ctrl12 to fine tune the array of capacitors, for example, C11 225A, C12 225B and C13 225C in the chip 201. In this manner, tuning the capacitance of the chip 201 may enable tuning a frequency response of the mobile terminal 150 such that signals in a desired frequency or frequency band may be received and/or transmitted.

The chip 201 may be bump-bonded or flip-chip bonded to the multi-layer package 213 utilizing the solder balls 211. In this manner, wire bonds connecting the chip 201 to the multi-layer package 213 may be eliminated, reducing and/or eliminating uncontrollable stray inductances due to wire bonds. In addition, the thermal conductance out of the chip 201 may be greatly improved utilizing the solder balls 211 and the thermal epoxy 221. The thermal epoxy 221 may be electrically insulating but thermally conductive to allow for thermal energy to be conducted out of the chip 201 to the much larger thermal mass of the multilayer package 213.

The circuit components 203A-L may comprise discrete components that may be bonded to or fabricated into the multi-layer package 213. The circuit components 203A-L may comprise discrete devices to be utilized in an RF system, for example. In another embodiment of the invention, the circuit components 203A-L may comprise one or more integrated circuits to provide custom features in instances when the chip 201 may comprise a general purpose switching IC.

The MEMS switch arrays 205A-D may comprise an array of MEMS switches fabricated in and/or on the multi-layer package 213. The MEMS switches in the MEMS switch arrays 205A-D may be individually addressable and may be utilized to couple components within the chip 201 to the circuit components 203A-L integrated in or on the multi-layer package 213. By incorporating MEMS switches and circuit components on the multi-layer package, as opposed to in the chip 201, chip area usage may be significantly reduced and performance improved, as discrete RF devices and MEMS switches typically have higher Q and reduced insertion loss, respectively, compared to their CMOS counterparts on-chip. A plurality of capacitors, for example, C1 223A, C2 223B and C3 223C may be fabricated in the multi-layer package 213 in order to tune a capacitance of the multi-layer package 213. One end of the plurality of capacitors, for example, C1 223A, C2 223B and C3 223C may be coupled to ground (GND) 227 via one or more solder balls 211. The other end of the plurality of capacitors, for example, C1 223A, C2 223B and C3 223C may be coupled to the chip 201 via one or more solder balls 211.

One or more of the MEMS switch arrays 205A-D may be enabled to control and/or switch the array of capacitors, for example, C1 223A, C2 223B and C3 223C in the multi-layer package 213 by generating one or more control signals. For example, the MEMS switch array 205A may be enabled to generate a control signal, ctrl1, to coarse tune the array of capacitors, for example, C1 223A, C2 223B and C3 223C in the multi-layer package 213. Similarly, the MEMS switch array 205C may be enabled to generate a control signal ctrl2 to coarse tune the array of capacitors, for example, C1 223A, C2 223B and C3 223C in the multi-layer package 213. In this manner, tuning the capacitance of the multi-layer package 213 may enable tuning a frequency response of the mobile terminal 150 such that signals in a desired frequency or frequency band may be received and/or transmitted. In various embodiments of the invention, the array of capacitors, for example, C1 223A, C2 223B and C3 223C may be in the IC, in the IC package, surface mount components on the package, surface mount components on a printed circuit board (PCB), or some combination thereof.

The metal layers 215A and 215B may comprise deposited metal layers utilized to delineate interconnects between devices, such as the circuit components 203A-L, in and/or on the multi-layer package 213. The number of metal layers may not be limited to the number of metal layers 205A and 205B shown in FIG. 2. Accordingly, there may be any number of layers embedded within the multi-layer package 213, depending on the number of contacts on the chip 201 coupled to the solder balls 211, and the number of the circuit components 203A-L fabricated within and/or on the multi-layer package 213.

The solder balls 211 may comprise spherical balls of metal to provide electrical, thermal and physical contact between the chip 201 and the multi-layer package 213. In making the contact with the solder balls 211, the chip may be pressed with enough force to squash the metal spheres somewhat, and may be performed at an elevated temperature to provide suitable electrical resistance and physical bond strength. The thermal epoxy 221 may fill the volume between the solder balls 211 and may provide a high thermal conductance path for heat transfer out of the chip 201. The solder balls 211 may also be utilized to provide electrical, thermal and physical contact between the multi-layer package 213 and a printed circuit board comprising other parts of the wireless system 150, described with respect to FIG. 1.

In operation, the chip 201 may comprise a system, such as the wireless system 150, described with respect to FIG. 1, and may be utilized to transmit, receive and process RF signals, for example. In this manner, the chip 201 may be electrically coupled to RF components or devices fabricated on and/or within the multi-layer package 213, such as transformers, baluns, transmission lines, inductors, capacitors, microstrip filters, coplanar waveguide filters and surface mount devices, for example. Heat from the chip 201 may be conducted to the multi-layer package via the thermal epoxy 221 and the solder balls 211. The MEMS switch arrays 205A-D may be utilized to couple RF devices fabricated in and/or on the multi-layer package 213 to associated components within the chip 201.

The chip 201 may generate control signals that may be utilized to actuate appropriate switches in the MEMS switch arrays 205A-D to electrically couple one or more of the circuit components 203A-L to the chip 201. In this manner components external to the chip 201 may be switched in and out of a circuit at high speeds and with minimal insertion loss.

This may be particularly necessary when processing low signal levels, which may often be the case for received wireless signals.

In another embodiment of the invention, the chip 201 and the multi-layer package 213 may be a platform on which custom circuits and/or devices may be integrated. In this manner, the chip 201 may comprise a general purpose switching IC, and one or more custom ICs may be integrated onto the multi-layer package 213.

Figure 3:
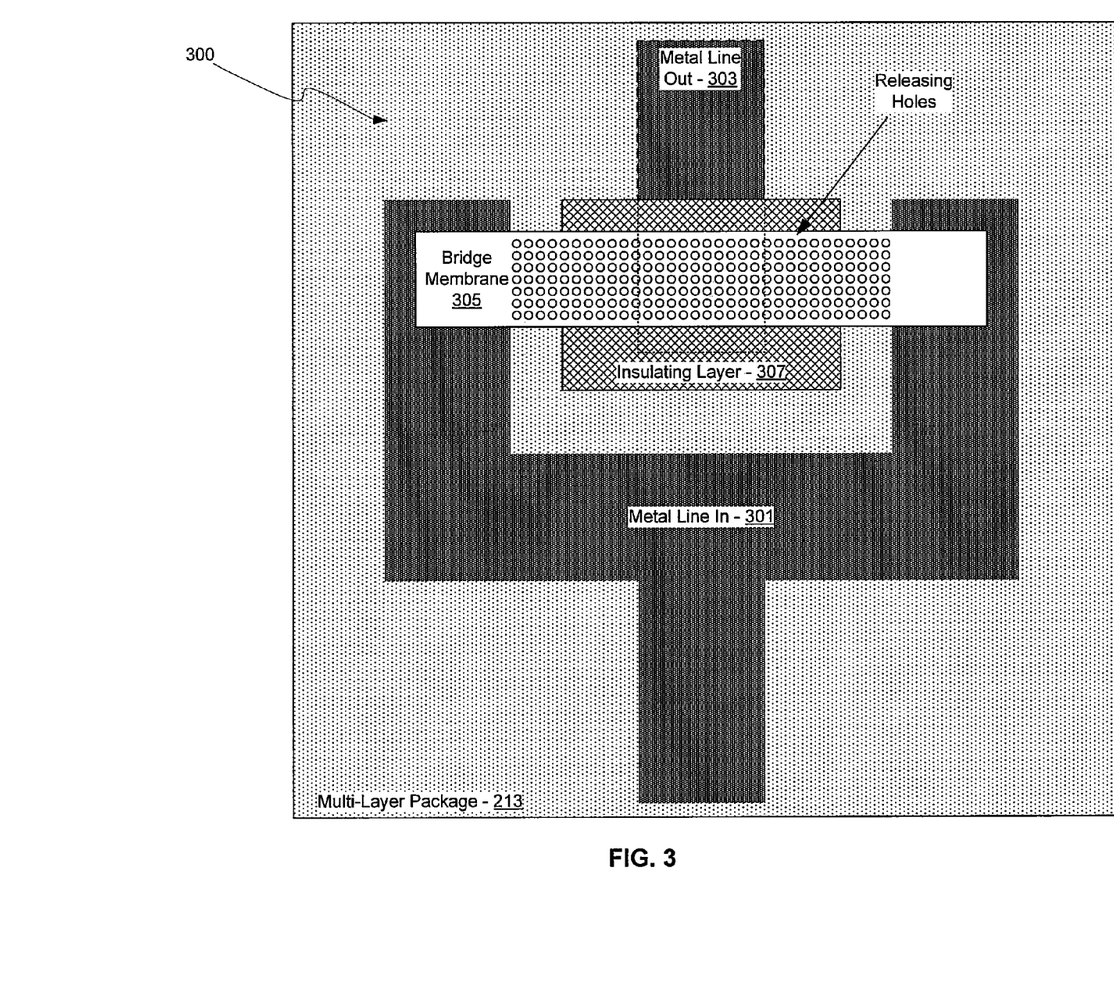
FIG. 3 is a block diagram of an exemplary MEMS switch, in accordance with an embodiment of the invention.

FIG. 3 is a block diagram of an exemplary MEMS switch, in accordance with an embodiment of the invention. Referring to FIG. 3, there is shown a MEMS switch 300 fabricated on the multi-layer package 213, described with respect to FIG. 2. The MEMS switch 300 may comprise a metal line in 301, a metal line out 303, a bridge membrane 305 and an insulating layer 307. The multi-layer package 213 may be covered with an electrically isolating layer, to provide electrical isolation between MEMS switches on the multi-layer package 213.

The metal line in 301 and the metal line out 303 may comprise metal layers deposited on the multi-layer package 213 and patterned into the structure shown. The bridge membrane 305 may comprise an conductive layer that may be supported on each end by the metal line in 301 and may be suspended over the insulating layer 307, when not in a closed position. The switching action of the MEMS switch 300 is described further with respect to FIG. 4.

The insulating layer 307 may comprise a dielectric layer, such as silicon nitride, for example that separates the metal line out 303 from the bridge membrane 305 when the MEMS switch 300 may be in the closed position.

In operation, the MEMS switch may be closed by applying a bias across the metal line in 301 and the metal line out 303, such that the bridge membrane 305 may be pulled downward toward the insulating layer 307. The actuating signal may be received from the chip 201, described with respect to FIG. 2. The resulting capacitor formed by the metal line in 301, the insulating layer 307 and the metal line out 303 may provide capacitive coupling of an RF signal from the metal line in 301 to the metal line out 303.

MEMS switches may utilize electrostatic force to produce mechanical movement to achieve a short or an open circuit in an RF transmission line. The switches may provide performance advantages such as low insertion loss, high isolation and virtually no power consumption making them ideally suited for use in wireless devices.

In another embodiment of the invention, the bridge membrane 305 may comprise ferromagnetic material such that it may be deflected by magnetic forces as opposed to electrostatic forces. The magnetic fields may be generated by applying electrical currents to an inductive coil integrated below the MEMS switch 300, for example.

Figure 4:
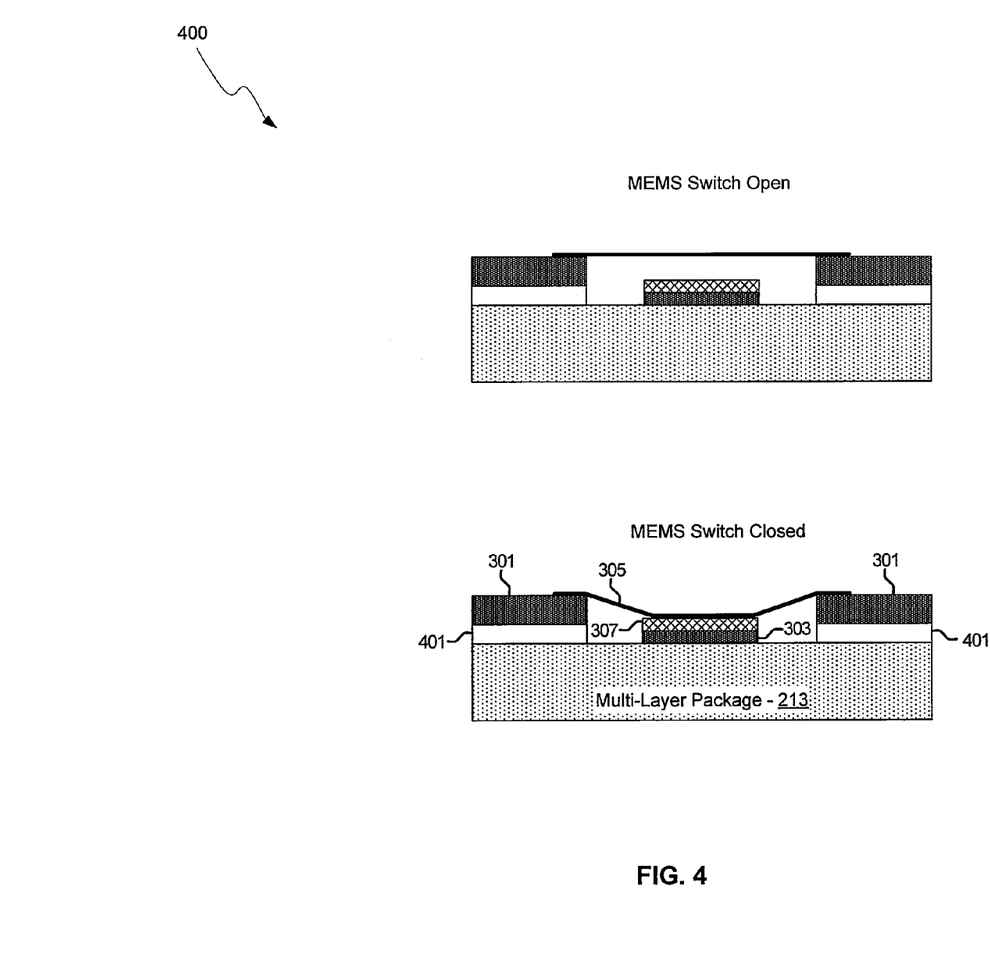
FIG. 4 is a block diagram illustrating an exemplary MEMS switch operation, in accordance with an embodiment of the invention.

FIG. 4 is a block diagram illustrating an exemplary MEMS switch operation, in accordance with an embodiment of the invention. Referring to FIG. 4, there is shown the cross-section view of a MEMS switch 400 in an open position (top) and in closed position (bottom). The MEMS switch 400 may comprise the metal line in 301, the metal line out 303, the bridge membrane 305, the insulating layer 307 and the electrically isolating layer 401, which may be substantially similar to the insulating layer 307. The metal line in 301, the metal line out 303 and the bridge membrane 305 may be as described with respect to FIG. 3.

In operation, with zero or low DC bias applied between the metal lines by the chip 201 via the solder balls 211, described with respect to FIG. 2, the bridge membrane may be essentially horizontal, such that the MEMS switch may be open (top). In instances where a high enough bias is applied across the metal line out 303 and the metal line in 301, the bridge membrane may be attracted toward the insulating layer 307 by electrostatic force, closing the switch (bottom).

Figure 5:
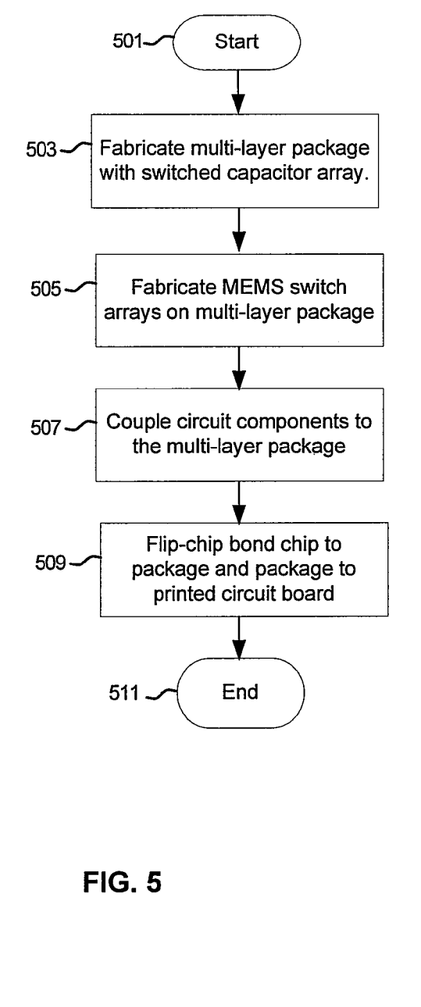
FIG. 5 is a flow chart illustrating exemplary steps for fabrication of MEMS switch arrays integrated in a multi-layer substrate, in accordance with an embodiment of the invention.

FIG. 5 is a flow chart illustrating exemplary steps for fabrication of MEMS switch arrays integrated in a multi-layer substrate, in accordance with an embodiment of the invention. Referring to FIG. 5, exemplary steps may begin at step 501. In step 503, the multi-layer package may be fabricated with one or more capacitors of a switched capacitor array and metal conductive lines to couple circuit components. In step 505, MEMS switch arrays may be fabricated on the top and/or bottom surfaces of the multi-layer package. In step 507, circuit components and one or more chips may be bonded to the multi-layer package. In step 509, the package may then be flip-chip bonded to a printed circuit board. Thermal epoxy may be utilized to fill the volume between the solder balls between the chip and the package, followed by end step 511.

Figure 6:
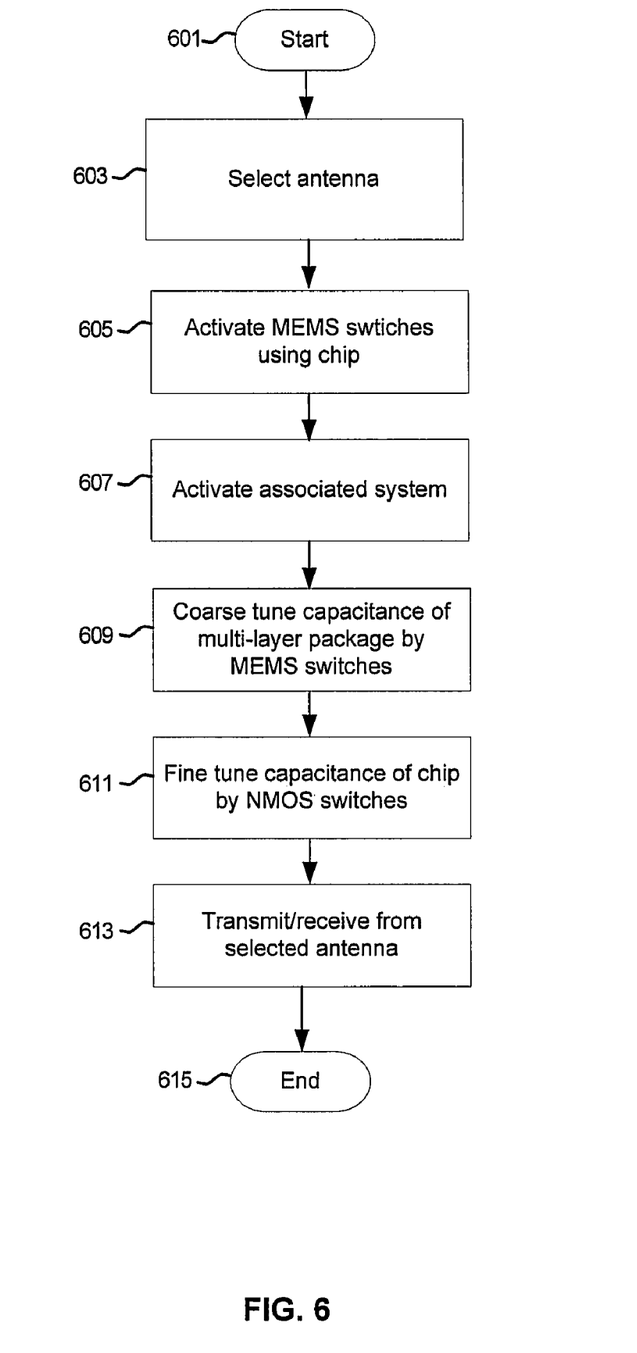
FIG. 6 is a flow chart illustrating exemplary steps for increased resolution switching using MEMS and switched capacitors, in accordance with an embodiment of the invention.

FIG. 6 is a flow chart illustrating exemplary steps for increased resolution switching using MEMS and switched capacitors, in accordance with an embodiment of the invention. Referring to FIG. 6, exemplary steps may begin at step 601. In step 603, one or more antennas may be selected for transmission and/or reception. In this regard, in various embodiments a plurality of antennas may be fabricated on an IC package and may be selected based on mode of transmission, mode of reception and/or desired frequency. Accordingly, one or more switches (on-chip and/or in the IC package) may be controlled via one or more control signals. In step 605, appropriate MEMS switches 205A-D may be activated to couple desired circuit components to the chip 201. In step 607, appropriate systems may be activated that may utilize the appropriate circuit components on the multi-layer package 213.

In step 609, one or more MEMS switches, for example, 205A and 205C may generate control signals, ctrl1 and ctrl2 to coarse tune the capacitance of an array of capacitors in the multi-layer package 213. In step 611, one or more NMOS switches may generate control signals ctrl11 and ctrl12 to fine tune the capacitance of an array of capacitors in the chip 201. In this manner, tuning the capacitance of the multi-layer package 213 and the chip 201 may enable tuning a frequency response of the mobile terminal 150 such that signals in a desired frequency or frequency band may be received and/or transmitted. In this regard, the mobile terminal 150 may be tuned to a desired transmit/receive frequency. In step 613, the mobile terminal 150 may begin transmitting and/or receiving via the selected one or more antennas. Control then passes to end step 615.

In accordance with an embodiment of the invention, a method and system for increased resolution switching using MEMS and switched capacitors may comprise a mobile terminal 150. The mobile terminal 150 may comprise an integrated circuit, for example, chip 201 that may be bump-bonded or flip-chip bonded to a multi-layer package 213. One or more MEMS switches, for example, 205A and 205C may be enabled to generate control signals ctrl1 and ctrl2 respectively to tune the capacitance of a first switched capacitor array, for example, the array of capacitors, C1 223A, C2 223B and C3 223C in the multi-layer package 213. The plurality of MEMS switches 205A-D may be integrated in and/or on the multi-layer package 213. The MEMS switches 205A-D may be actuated electrostatically and/or magnetically. One or more NMOS switches may be enabled to generate control signals ctrl11 and ctrl12 respectively to tune the capacitance of a second switched capacitor array, for example, the array of capacitors, C11 225A, C12 225B and C13 225C in the integrated circuit, for example, chip 201. A plurality of signals may be transmitted and/or received via one or more antennas, for example, 151A-D in the mobile terminal 150 based on the tuning of the capacitances of the first and second switched capacitor arrays.

The capacitance of the second switched capacitor array, for example, the array of capacitors, C11 225A, C12 225B and C13 225C in the integrated circuit, for example, chip 201 may be coupled to the multi-layer package 213 via one or more solder balls 211. One or more capacitors, for example, C1 223A, C2 223B and C3 223C of the first switched capacitor array may be integrated within and/or on the multi-layer package 213. The capacitors, for example, C1 223A, C2 223B and C3 223C of the first switched capacitor array may be coupled to the integrated circuit, for example, chip 201 via one or more solder balls 211. The multi-layer package 213 may comprise one or more layers of ferromagnetic and/or ferrimagnetic material.

Certain embodiments of the invention may comprise a machine-readable storage having stored thereon, a computer program having at least one code section for increased resolution switching using MEMS and switched capacitors, the at least one code section being executable by a machine for causing the machine to perform one or more of the steps described herein.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for wireless communication, the method comprising:
    in a mobile terminal comprising an integrated circuit bonded to a multi-layer package:
        tuning a capacitance of a first switched capacitor array in said multi-layer package via one or more MEMS switches integrated in and/or on said multi-layer package; tuning a capacitance of a second switched capacitor array in said integrated circuit via one or more NMOS switches; and
        transmitting and/or receiving signals via one or more antennas in said mobile terminal based on said tuning.

2. The method according to claim 1, comprising generating one or more control signals to tune said capacitance of said second switched capacitor array in said integrated circuit.

3. The method according to claim 1, wherein one or more capacitors of said second switched capacitor array in said integrated circuit are coupled to said multi-layer package via one or more solder balls.

4. The method according to claim 1, comprising generating one or more control signals to tune said capacitance of said first switched capacitor array in said multi-layer package.

5. The method according to claim 1, wherein one or more capacitors of said first switched capacitor array are integrated within and/or on said multi-layer package.

6. The method according to claim 5, wherein said one or more capacitors of said first switched capacitor array are coupled to said integrated circuit via one or more solder balls.

7. The method according to claim 1, wherein said multi-layer package comprises one or more layers of ferromagnetic and/or ferrimagnetic material.

8. The method according to claim 1, wherein said integrated circuit is flip-chip bonded and/or bump-bonded to said multi-layer package.

9. The method according to claim 1, comprising actuating said MEMS switches electrostatically and/or magnetically.

10. A system for wireless communication, the system comprising:
    one or more circuits for use in a mobile terminal comprising a multi-layer package bonded to an integrated circuit, said multi-layer package comprising a first switched capacitor array, wherein one or more MEMS switches integrated in and/or on said multi-layer package are operable to tune said first switched capacitor array; tune a capacitance of a second switched capacitor array in said integrated circuit via one or more NMOS switches; and
    said one or more circuits are operable to transmit and/or receive signals in said mobile terminal via one or more antennas based on said tuning.

11. The system according to claim 10, wherein said one or more circuits are operable to generate one or more control signals to tune said capacitance of said second switched capacitor array in said integrated circuit.

12. The system according to claim 10, wherein one or more capacitors of said second switched capacitor array in said integrated circuit are coupled to said multi-layer package via one or more solder balls.

13. The system according to claim 10, wherein said one or more circuits are operable to generate one or more control signals to tune said capacitance of said first switched capacitor array in said multi-layer package.

14. The system according to claim 10, wherein one or more capacitors of said first switched capacitor array are integrated within and/or on said multi-layer package.

15. The system according to claim 14, wherein said one or more capacitors of said first switched capacitor array are coupled to said integrated circuit via one or more solder balls.

16. The system according to claim 10, wherein said multi-layer package comprises one or more layers of ferromagnetic and/or ferrimagnetic material.

17. The system according to claim 10, wherein said integrated circuit is flip-chip bonded and/or bump-bonded to said multi-layer package.

18. The system according to claim 10, wherein said one or more circuits are operable to actuate said MEMS switches electrostatically and/or magnetically.

19. The system according to claim 10, wherein said multi-layer package bonded to said integrated circuit is integrated within a mobile terminal.

\* \* \* \* \*